United States Patent [19]

Turgeon

[11] Patent Number: 5,082,196
[45] Date of Patent: Jan. 21, 1992

[54] VIDEO CARTRIDGE ADAPTER INTERLOCK SYSTEM

[75] Inventor: Thomas A. Turgeon, Fridley, Minn.

[73] Assignee: Minneapolis Mining and Manufacturing Company, St. Paul, Minn.

[21] Appl. No.: 582,436

[22] Filed: Sep. 13, 1990

[51] Int. Cl.$^5$ .............................. G11B 15/66
[52] U.S. Cl. .................. 242/199; 360/132; 242/195
[58] Field of Search ............. 242/198-200, 242/195; 360/94, 132

[56] References Cited

U.S. PATENT DOCUMENTS

| | | | |
|---|---|---|---|
| 4,567,536 | 1/1986 | Tsuchiya | 242/199 |
| 4,595,962 | 6/1986 | d'Alayer de Costemore d'Arc | 242/199 |
| 5,031,065 | 7/1991 | Flor et al. | 360/132 |
| 5,034,842 | 7/1991 | Turgeon | 360/132 |

FOREIGN PATENT DOCUMENTS 58-141476  8/1983  Japan ........................ 360/94

Primary Examiner—John M. Jillions
Assistant Examiner—John Q. Nguyen
Attorney, Agent, or Firm—Merchant, Gould, Smith, Edell, Welter & Schmidt

[57] ABSTRACT

A cartridge containing a single supply reel of magnetic tape is inserted into an adapter which converts the cartridge format to the VHS standard format. The adapter includes an interlock system which prevents the acceptance of the adapter by the VHS machine until the magnetic tape on the supply reel is advanced onto the take-up reel of the adapter.

6 Claims, 10 Drawing Sheets

VIDEO CARTRIDGE ADAPTER INTERLOCK SYSTEM

FIELD OF THE INVENTION

The present invention relates to video tape cartridges and video tape cartridge adapters which may be used to adapt a single supply reel video cartridge to the standard VHS video cassette format to permit the use of the cartridge in conventional VCR videotape machines More particularly, the invention relates to the adapter and to an interlock system which prevents the use of the video cartridge adapter until certain events have taken place within the video tape adapter.

BACKGROUND OF THE INVENTION

Traditionally, consumer video tape media is distributed in a video cassette format. The video cassette contains both, a supply reel for storing a quantity of magnetic recording media and a take-up reel. In the cassette format the tape on the supply reel is physically connected to the take-up reel. In operation the tape is advanced onto the take-up reel during operation of the video tape equipment. This "cassette" style package provides a tape format which is convenient to use. One drawback to this packaging strategy is that an empty take-up reel is stored along with a supply reel, which renders this format inefficient for the storage of magnetically recorded information.

The storage of magnetic recording media on a single spool video cartridge has been proposed as a method of increasing the storage efficiency for tape products. For example, U.S. Pat. No. 4,577,811 teaches an autothread tape cartridge for storing digital magnetic tape.

Single supply reel video cartridges are also disclosed in U.K. Patent application 2,217,684 A, which shows a single spool video cartridge for use with VHS format adapter.

SUMMARY OF THE INVENTION

In contrast to prior art structures, the present invention discloses a video cartridge adapter having interlock structures which prevent the use of the adapter until the adapter has been properly configured for use.

In operation the user inserts the video cartridge into the adapter which activates mechanisms which result in the formation of an "interconnection". The interconnection hardware couples the tape on the supply reel of the video cartridge to the take-up reel located within the video cartridge adapter. This interconnection forms a specie of actuator means for operating the interlock mechanisms.

In general, the interlock system monitors the position of the interconnection actuator, and performs the following three interlock functions dependant on the position of the interconnection.

The interlock actuator operates on the tape access door to prevent opening of the access door until the interconnection is safely within the take-up side of the adapter.

The door, once open, operates on certain interlock elements to prevent withdrawal of the interconnection from the take-up side of the adapter and thus, prevents damage to the VCR under certain failure modes which would attempt to withdraw the interconnection from the take-up side of the adapter.

The interlock also prevents the physical insertion of the adapter into the VCR, until certain interlock conditions have been satisfied.

Although the various interlock functions are coupled together in the preferred and illustrative embodiment shown in the drawing, each of the interlock functions may be used alone or in combination with other structures in the adapter.

BRIEF DESCRIPTION OF THE DRAWING

In the drawing, in which like reference numerals indicate corresponding structures throughout the views.

DETAILED DESCRIPTION OF THE PREFERRED EMBODIMENT

Figure 1:
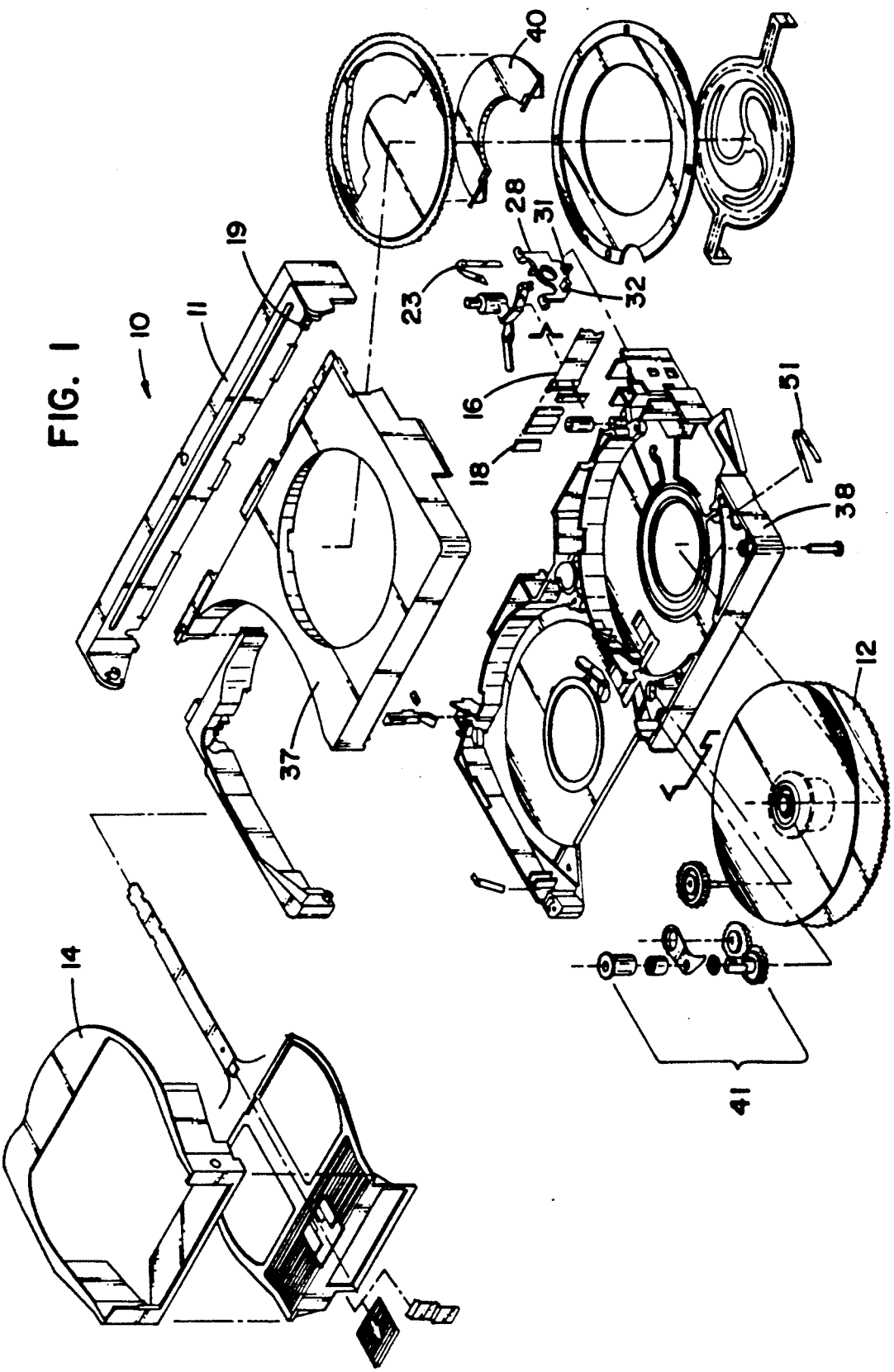
FIG. 1 is an exploded isometric view of the adapter, depicting the interlock structures and related elements to describe the cooperating context of the invention.

In the following detailed description of the preferred embodiment, reference is made to illustrative embodiments of the invention. It is to be understood that other embodiments may be used without departing from the scope of the present invention.

OVERVIEW

The context for the present invention in an adapter which converts a specialized video tape cartridge to the industry standard, VHS format. The video cartridge is inserted into the adapter. The adapter is then prepared for insertion into a conventional VHS videotape machine or VCR. It is intended that the cartridge/adapter combination be the functional equivalent of, and mimic the behavior of a conventional VHS videotape cassette, when inserted into a conventional VCR machine.

In use, the user places the cartridge in a door structure which is a portion of the video adapter. Closure of this door automatically mates tape connection hardware within the cartridge to tape connection hardware associated with the take-up reel mechanisms in the adapter. This procedure results in the formation of an interconnection.

It is important that the mechanical interconnection hardware be properly advanced onto the take-up reel prior to insertion of the adapter into the video tape machine, otherwise damage may occur to the tape heads of the video tape machine.

In the embodiment shown in the drawing, the interconnector carries an actuator pin. The passage of this interconnection actuator pin, past a forked arm activates three interrelated interlock functions. The forked arm rotates to invoke a first "door lock" function. The "anti-insertion" function mechanisms are slaved to the "door lock" apparatus and operates in unison with the "door lock" function. Once the adapter is inserted in to the VCR machine, the VCR machine opens the tape access door, which invokes the third "containment" function.

The first function, prevents the opening of the tape video cartridge adapter tape access door until the interconnection between the supply reel and take-up reel has been advanced to the take-up side of the adapter. This aspect of the invention is referred to throughout as the "door lock" function.

The second function prevents the insertion of the adapter into the VHS machine until the interconnection between the supply reel and the take-up reel has been advanced to the take-up side of the adapter. This is function is referred to throughout as the "anti-insertion" function.

The third function contains the containment of the interconnection hardware within the adapter during certain failure modes. This function is achieved by disabling and immobilizing certain interlock structures once the tape access door is open. This third function which traps the interconnector hardware on the take-up side of the adapter, is referred to throughout as the "containment" function.

GENERAL OPERATION

The video cartridge has a single supply reel located within it which stores the magnetic tape media. A cartridge door 14 located in the adapter 10 receives this cartridge and positions it within the adapter upon closure of the cartridge door 14. Other forms of cartridge acceptance means are described in U.S. patent application Ser. No. 07/381,159 filed 07/17/89. This copending Patent application is incorporated by reference herein.

The adapter 10 itself comprises a housing having an upper portion 37 and a lower portion 38 which has a take up reel 12 located laterally within it. Specialized connector mechanisms are associated with the take-up reel and the cartridge to connect the magnetic tape stored on the supply reel within the cartridge to the take-up reel located within the adapter.

Figure 2:
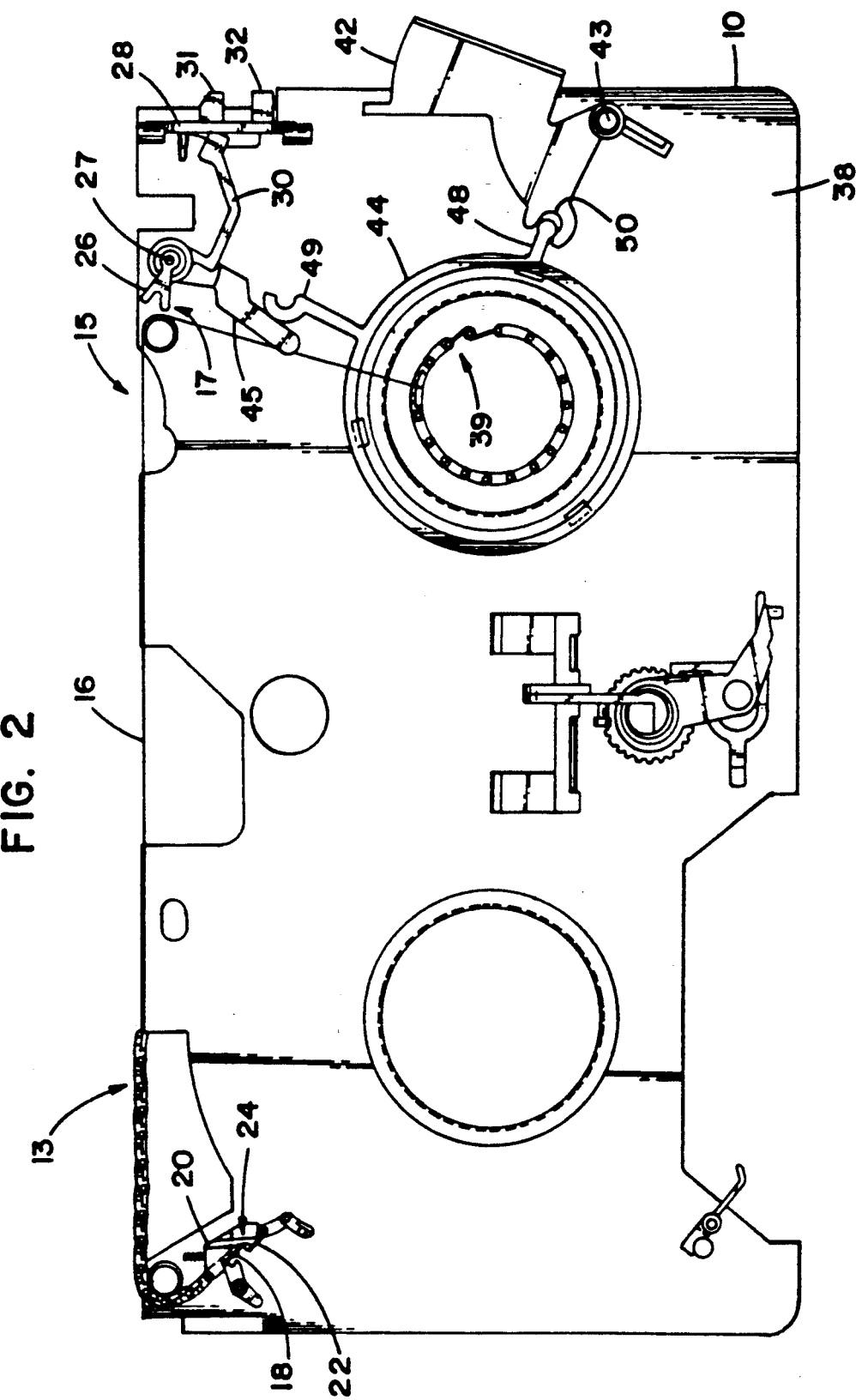
FIG. 2 is a schematic mechanical diagram depicting interlock elements in plan view.

For example, with reference to FIG. 2, the take-up reel has a tether 16 attached to it. The free end of the tether 16 is terminated in a tether interconnector 18. The other end of the tether 16 is anchored in the take-up reel. The free end is threaded across the front of the adapter defining the tape path.

The tether interconnector 18 which terminates the tether is trapped and retained on the video cartridge side or supply side of the adapter by a specialized spring loaded keeper clamp 20.

The tape stored in the video cartridge has one end anchored to the supply reel, while the free end is terminated with a tape interconnector 22.

The manual insertion of the videocartridge into the adapter and closure of the door mates the tape interconnector 22 within the cartridge to the tether interconnector 18, which is trapped and held on the supply side 13 of the adapter.

When the tape interconnector 22 and the tether interconnector 18 are joined, the two interconnectors form a tape/tether "interconnection" generally designated 24.

Once the cartridge is fully seated in the adapter the tape/tether interconnection 24 is released by the keeper clamp 20 and it may be manually advanced onto the take-up reel 12 through the use of the winder 40.

The adapter contains a user powered manual winder structure to move the interconnector along the tape path. These structures are used to wind or rewind the tape/tether interconnection 24 from the supply side 13 to the take-up side of the adapter, to prepare the adapter for insertion into the videotape machine.

An understanding of the winder gear train is not essential to an understanding of this invention and it should be appreciated that a motorized apparatus may be used to move the interconnection actuator structure along the tape path. However, briefly, in the embodiment of FIG. 1, the user rotates key 40 which transfers power to a clapper gear assembly generally designated 41 in FIG. 1. The clapper gear engages a gear flange of the take-up reel 12 to advance the interconnection 24 to the take-up side 15 of the adapter. U.S. patent application Ser. No. 07/398,068 filed 08/24/89 describes a related winding mechanism in greater detail. This Patent application is incorporated by reference herein.

Once the tape/tether interconnection 24 is seated on the take-up reel as shown at 39 in FIG. 2., the adapter is ready for insertion into the VHS machine. In this position the tape/tether interconnection and associated structures form a winding surface for the magnetic media.

Reference may be had to U.S. patent application Ser. No. 07/381,159 filed 07/17/89 which incorporated by reference herein, describes tape/tether interconnection apparatus in greater detail.

DOOR LOCK FUNCTION

It has been found that all consumer VHS videotape machines or VCRs expel or "eject" the VHS videocassette if the tape access door located on the front of the videocassette is "jammed" shut.

In operation, the "door lock" function of the interlock mechanism mimics a jammed cassette by locking the tape access door in the closed position until the tape/tether interconnection is advanced into the take up side of the housing.

The tape access door 11 (FIG. 1) of the adapter 10 is retained in the closed position by the door interlock mechanism until the tape/tether interconnection 24 has traversed the tape path from the supply side 13 (left side of FIG. 2) to the take-up side 15 (right side of FIG. 2) of the adapter 10.

Figure 5:
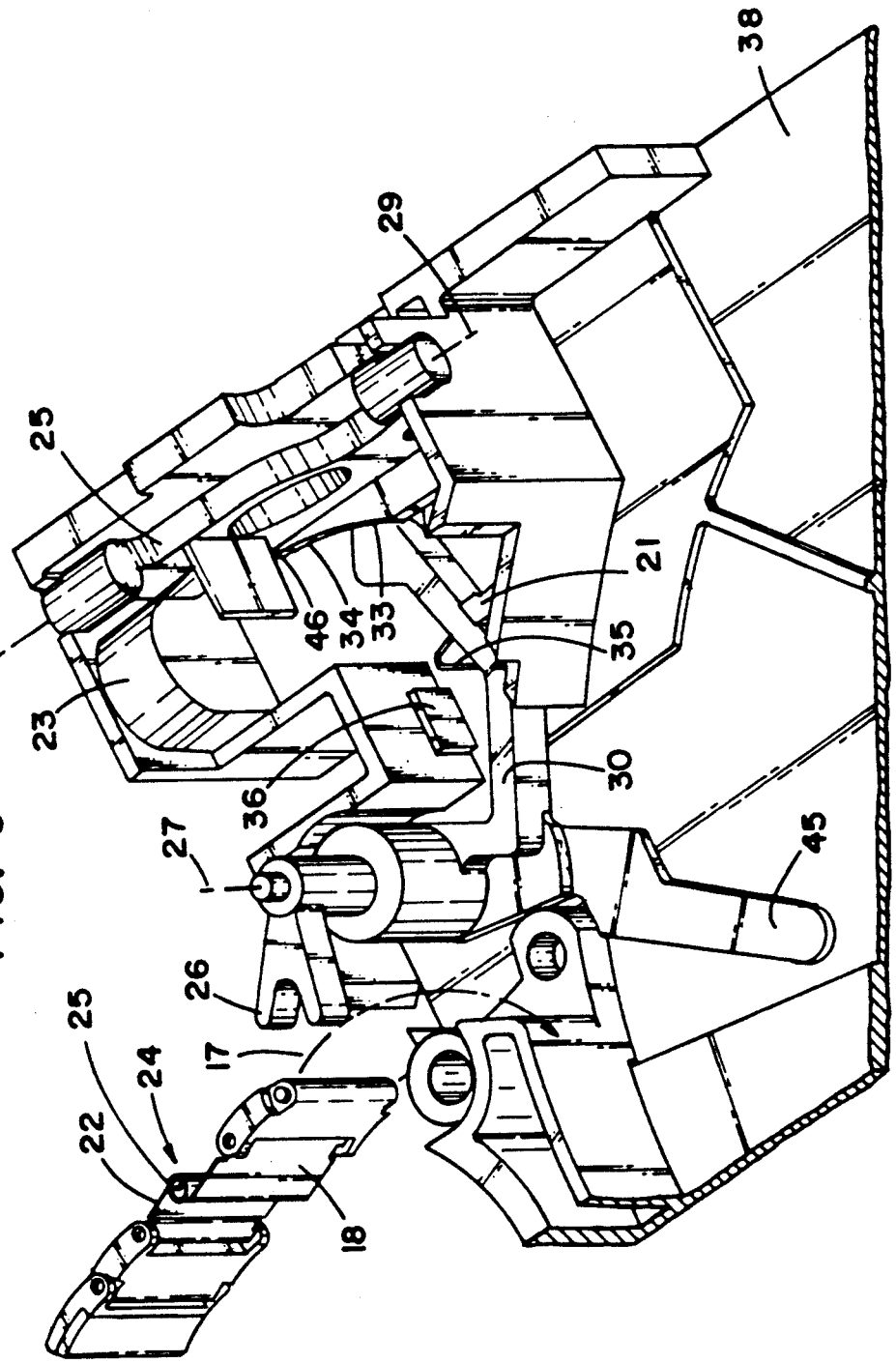
FIG. 5 is an isometric view of the "door lock" structures in the "door interlocked" position.

The interlock structures are activated by the passage of the interconnection through a channel 17, best seen in FIG. 5.. A forked actuator 26 intercepts and engages a portion of the interconnection 24. Continued motion of the interconnection 24 along the tape path rotates the forked actuator 26 about a pivot axis 27. The rotation of the forked actuator operates the interlock structures.

Figure 3:
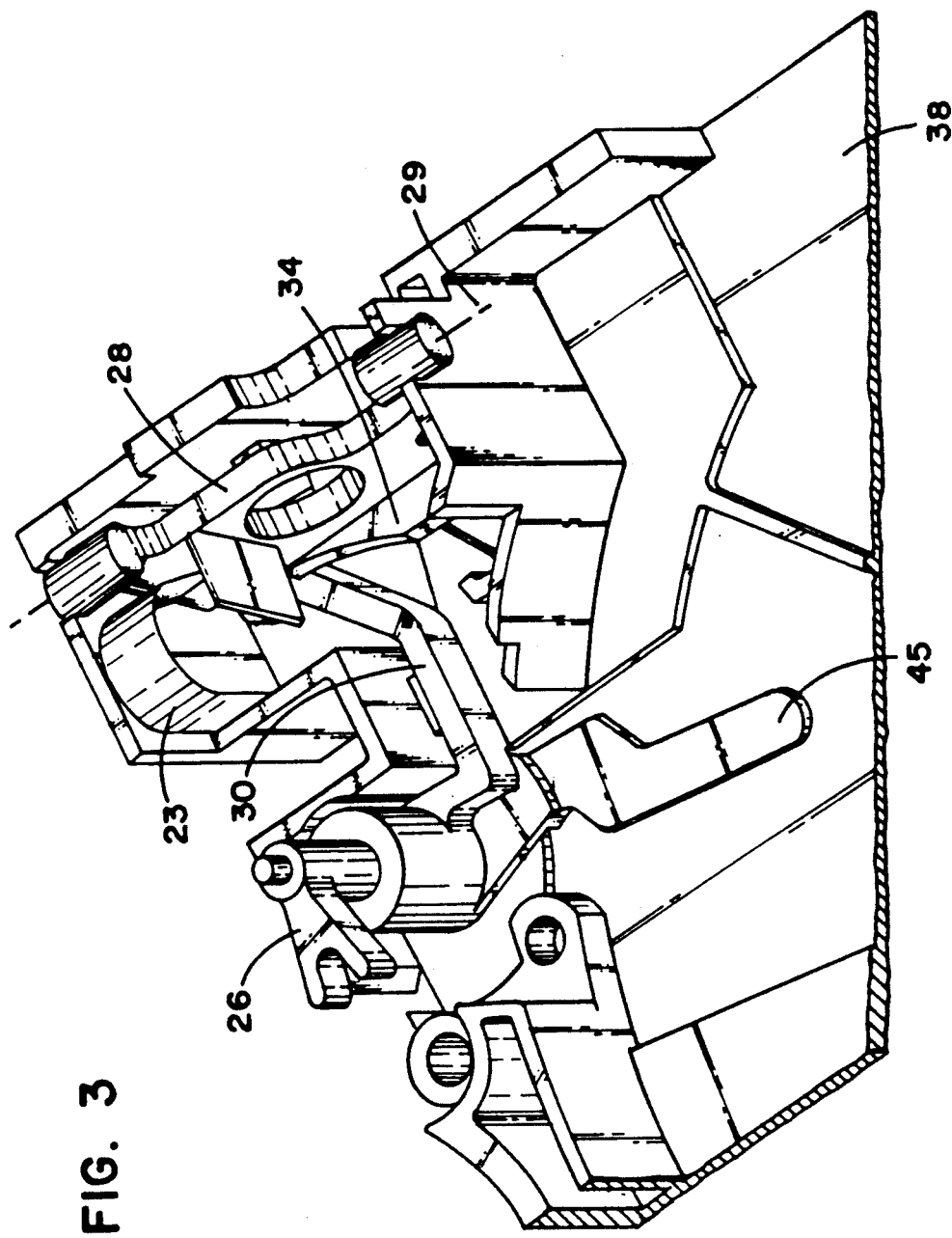
FIG. 3 is an isometric view of the "door lock" structures in the "door normal" position.
Figure 4:
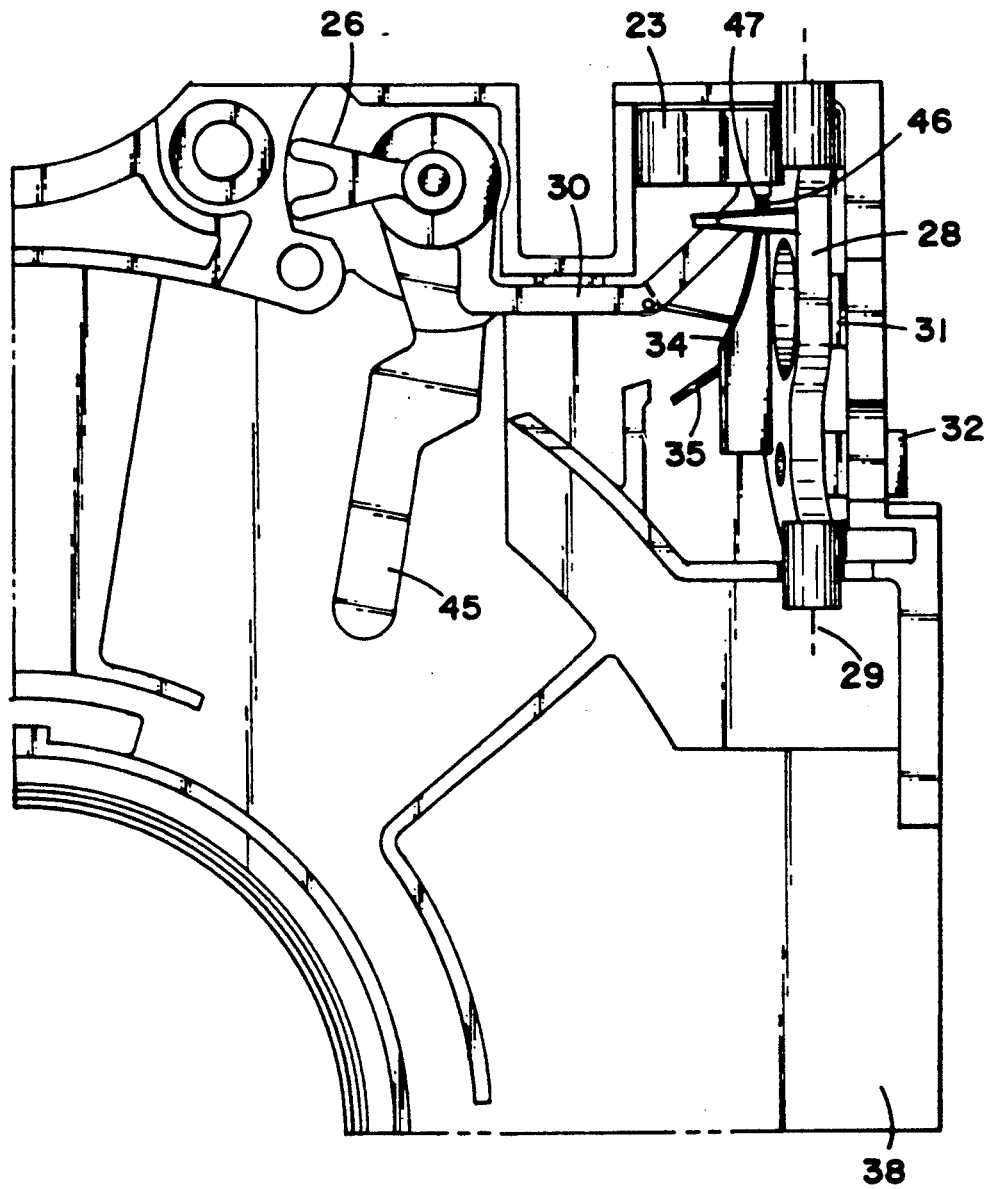
FIG. 4 is a plan view of the "door lock" structures depicting the mechanisms in the same configuration as FIG. 3.
Figure 6:
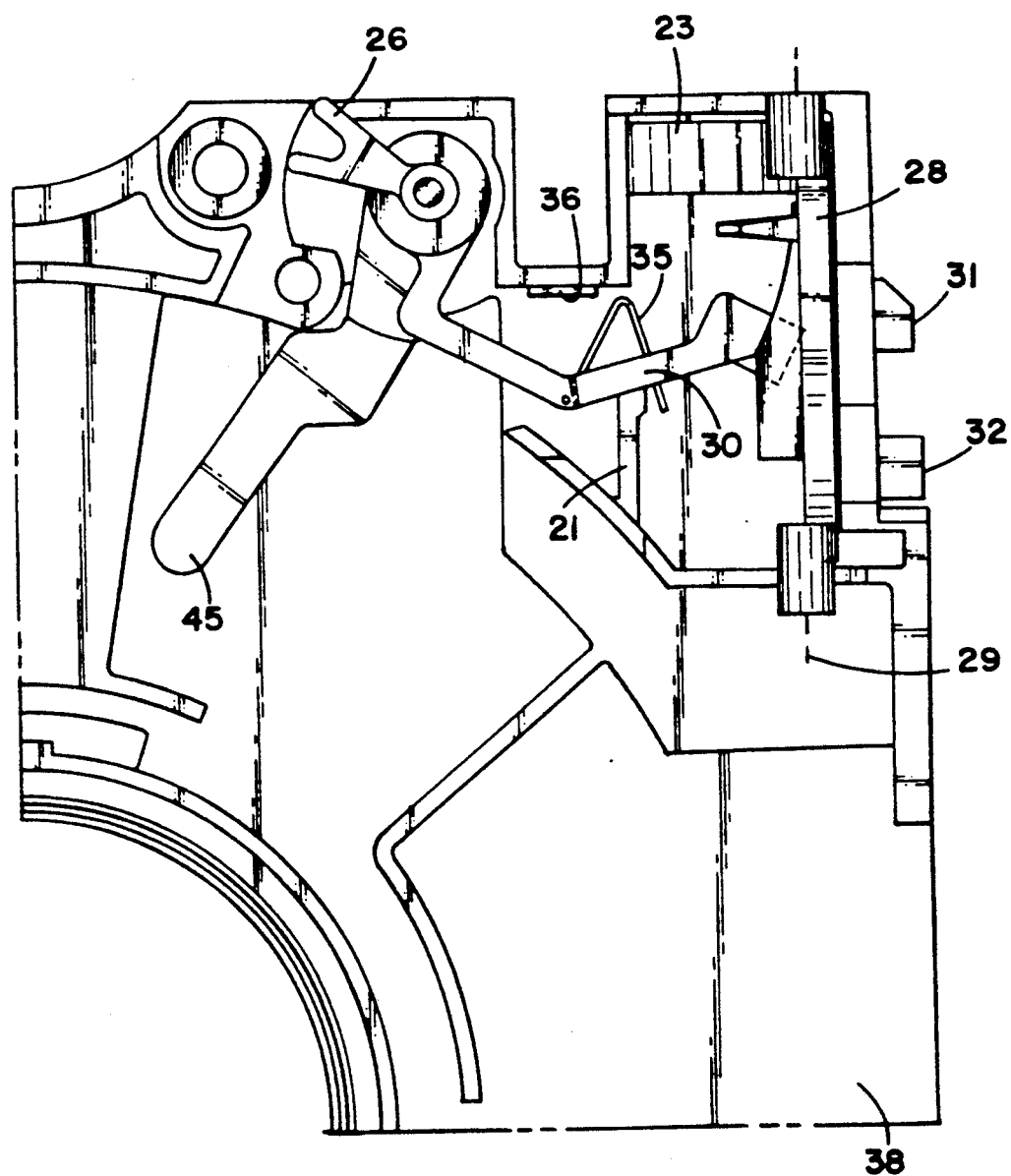
FIG. 6 is a plan view of the "door lock" mechanisms depicting the mechanisms in the same configuration as FIG. 5.
Figure 7:
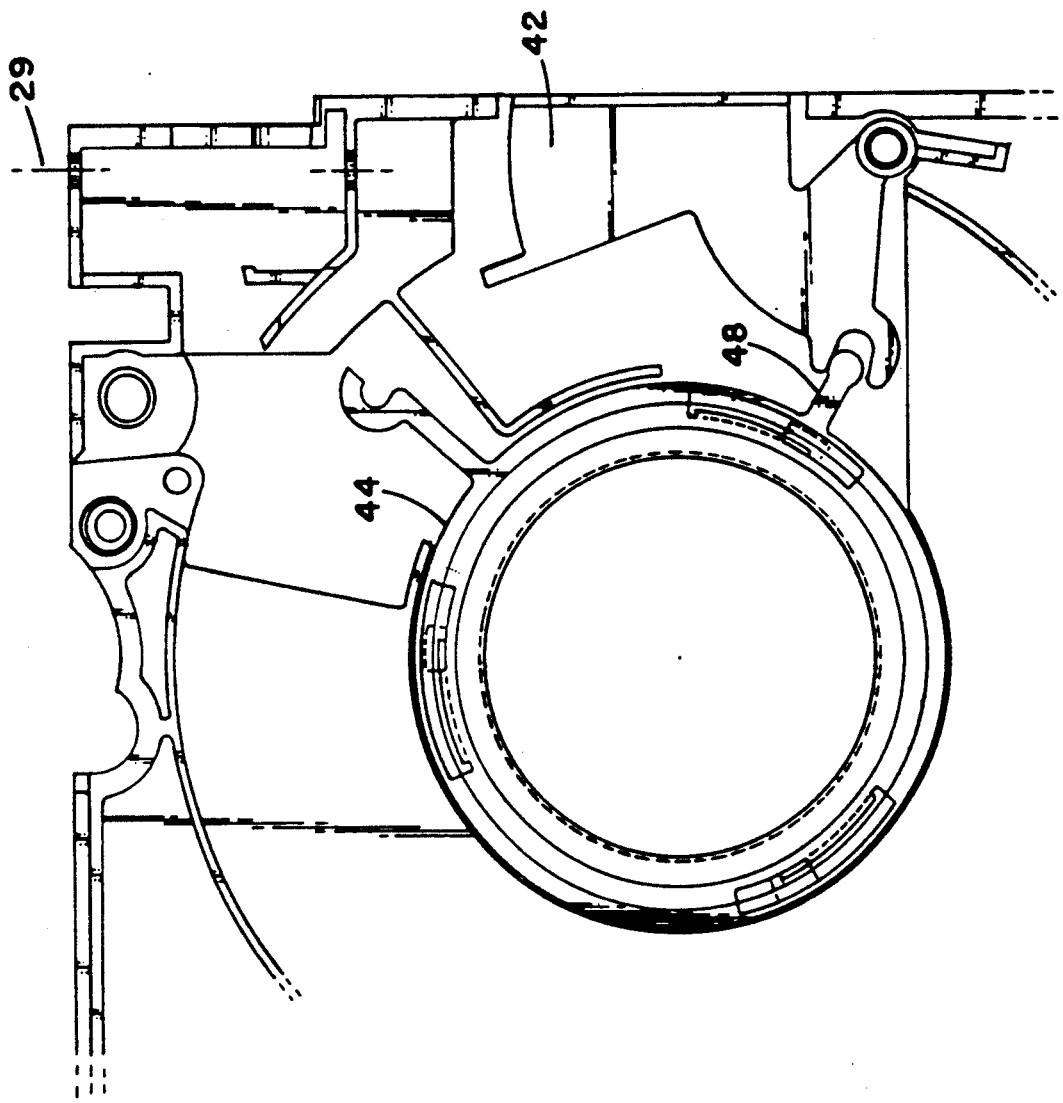
FIG. 7 is a plan view of the "anti-insertion" mechanisms depicting the anti-insertion tab in the position corresponding to the "door locked" position.
Figure 8:
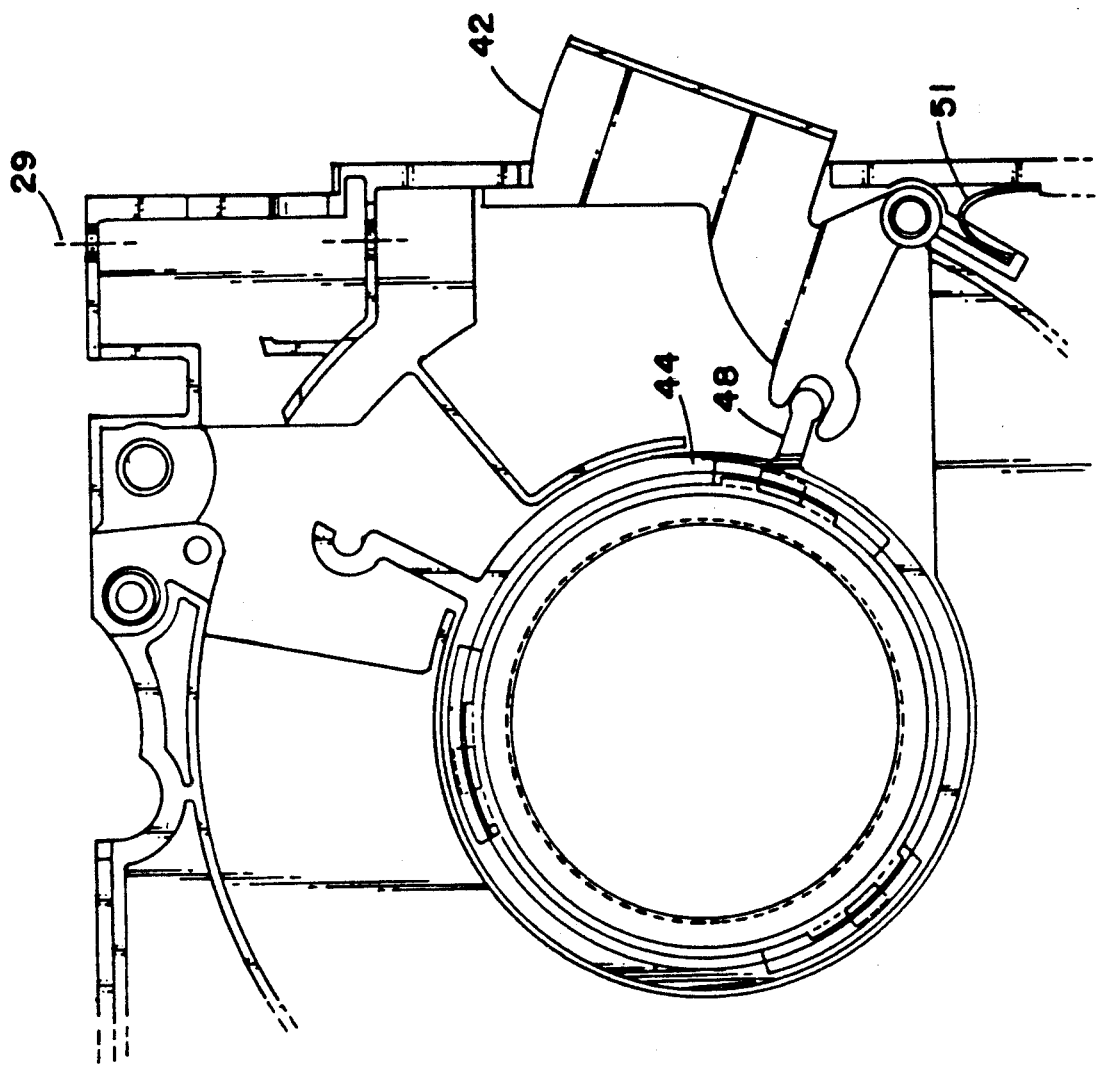
FIG. 8 is a plan view of the "anti-insertion" mechanisms depicting the anti-insertion tab in the position corresponding to the "door interlocked" position.

The counterclockwise rotation of the actuator 26 caused by the interconnection 24 moves the interlock arm 30, from the "door interlocked" position depicted in FIG. 5 and 6; to the "door normal" position depicted in FIG. 3 and 4.

In the "door interlocked" position of FIG. 5 and FIG. 6, the lock plate 28 is prevented from moving. In the "door normal" position of FIG. 3 and FIG. 4, the lock plate 28 is free to operate in the conventional manner of a VHS cassette.

This lock plate 28 controls the operation of the door 11. The lock plate 28 is hinged about an axis 29 which is best discerned in FIGS. 3 and 5. The lock plate itself carries two prongs best seen in FIG. 1. The first prong is referred to as the door lock prong 31. This lock prong 31 cooperates with a recess in the tape access door 11 to retain the door in the closed position when the lock prong 31 is inserted within the door recess. The second prong, referred to as the release prong 32. The release prong 32 is operated upon by the conventional VHS tape transport mechanisms which depress the release prong 32 to open the door 11.

The lock plate 28 is biased by a spring 23, shown in isolation on FIG. 1 and in place in other figures. This spring 23 biases the lock plate 28 into a locked position indicated by the position of plate 28 in FIGS. 5 and 6. When the lock plate is in this position, the door 11 is normally locked. The normally locked position for the tape access door prevents unintentional access to the tape path during routine handling of the adapter. Withdrawal of the lock prong 31 from a recess within the door is required to permit the tape access door to be opened. In normal operation, the VHS tape transport mechanism will withdraw this lock prong 31 from the door recess by "camming" or depressing release prong 32. This "camming" action rotates the lock plate about its hinge axis 29 and consequently withdraws the lock prong 31 from its door recess thus permitting the door 11 to be opened.

However, the camming action, just described, is prevented when the interlock arm 30 moves into the "door interlocked" position behind the lock plate 28 as shown most clearly in FIG. 5 and 6. In this position the interlock arm moves into abutment with the lock plate 28 and prevents the "camming action", thus mimicking a jammed VHS cassette. The shape of the abutment surface 33 is most easily discerned from the isometric projection views of FIG. 6 and 5.

Turning to FIG. 5 the interlock arm 30 has an abutment surface 33 which is moved into engagement with a complimentary abutment surface 34 located on the lock plate 28. When these two surfaces are moved into engagement, the lock plate 28 cannot be moved by the videotape machine and the VHS machine will enter the eject cycle and expel the adapter.

It is desirable to have a wedging action between these two abutment surfaces to eliminate movement of the lock plate 28 when in the "interlock position". This effect may be achieved by positioning the axis 27 eccentrically from the center of the radius of the abutment surface 33.

It is desirable to have the lock arm have two stable positions corresponding to the "door interlocked" position of FIG. 5 and 6, and the "door normal" position of FIG. 3 and 4. To achieve this result, detentes may be provided at either extreme of motion or a toggle action may be provided. The toggle action, illustrated in FIG. 4 and 6, is preferred.

As shown best in FIG. 4 and 6, a toggle spring 35, is anchored in both the base 38 of the adapter and the interlock arm 30. This toggle spring 35 provides a stable overcenter action when the interlock arm is toggled from one position to the other.

The spring 35 urges the arm 30 against stop surfaces which limit the rotation of the arm 30. In FIG. 5 a stop surface 36 is molded into the lower piece 38 of the adapter which limits the clockwise rotation of the interlock arm 30. In a similar fashion, FIG. 6 shows a molded feature on lower piece 38 which forms a stop surface 21 for clockwise rotation of the interlock arm 30.

Returning to FIG. 5, there is shown the tape/tether interconnection 24 depicting an interconnection pin 25 which in the preferred embodiment extends above the base surfaces of the tape and tether. It is preferred to form this pin 25 integrally with the tether connector 18. However, this pin structure could be located on the tether interconnector 22 in an alternative embodiment. This pin nests between the tines of the forked actuator 26 and toggles the arm to the "door normal" position when the interconnector enters the take-up side of the adapter.

In a similar fashion, at the conclusion of the rewinding process the user will remove the adapter from the VCR and manually move the interconnection from the take-up side to the supply side of the adapter to release the cartridge. This retraction of the interconnection pin 25 will move the arm 30 from the "door normal" position to the "door interlocked" position.

CONTAINMENT FUNCTION

As previously described, normal operation involves rewind of the interconnection from the take-up side of the adapter to the home position where the tether interconnector is engaged with a keeper 20 on the supply side of the adapter. In normal operation this process occurs only when the adapter is outside of the VCR and the tape access door is closed. However certain failure modes may occur within the VCR which involve an attempt to rewind the interconnection 24 out of the take-up side 15 of the adapter when the tape access door 11 is in the opened position. This occurrence would damage the VCR. Certain electro/optical failures within the VCR could attempt this aberrant operation.

The interconnector containment function is best discerned from FIG. 4. In this figure, the VHS tape transport has "cammed" the release prong 32 to withdraw the lock prong 31 from the door recess (not shown). At this point in transport operation, the transport will lift the tape access door 11 into an opened position overcoming the biasing force of torsion spring 19 (FIG. 1). Removal of the lock prong from the door recess and rotation of the door about its pivot prevents rotational movement of the lock plate 28. A notch is formed in the lock plate which intercepts a cooperative recess 47 in the interlock arm 30. In most VCRs, the camming of the release prong 32 corresponds to the door open phase of VCR operation. Consequently, while the tape heads have access to the tape the arm 30 is immobilized.

Figure 9:
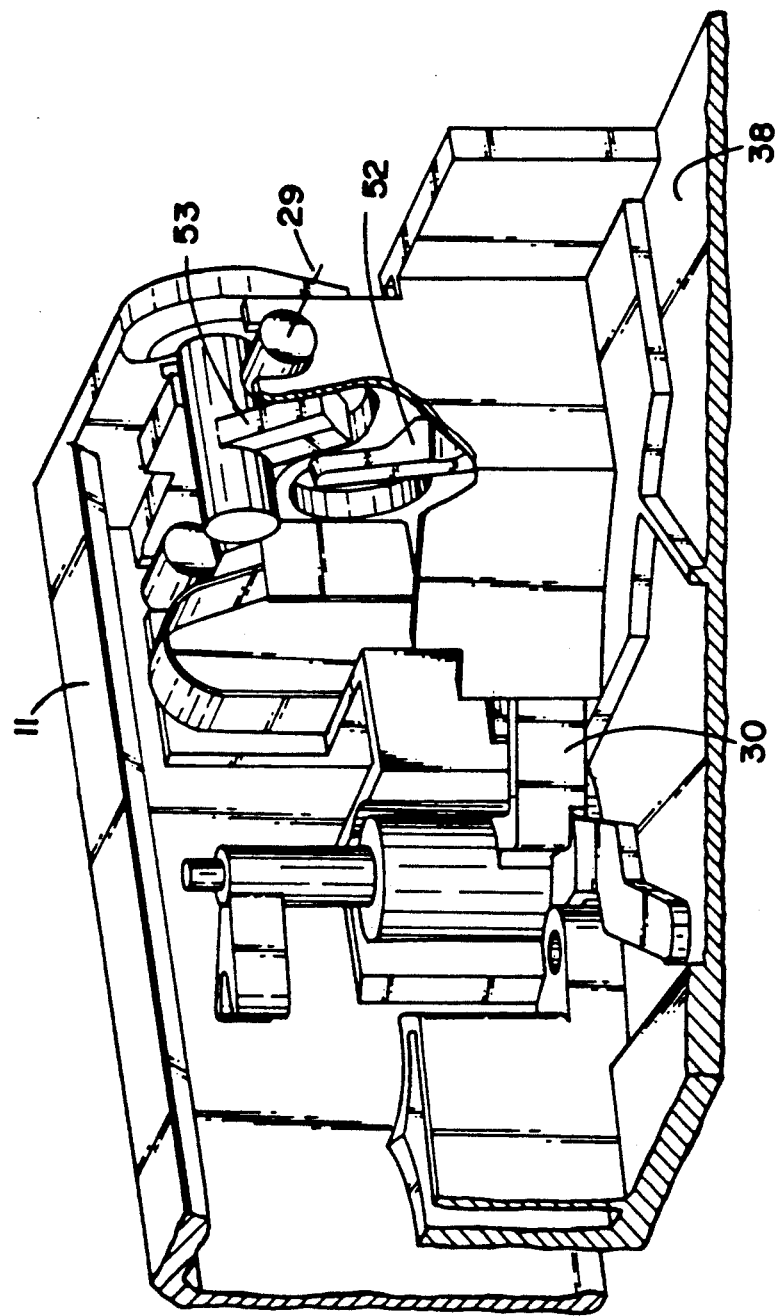
FIG. 9 is an isometric view of the door lock structure, illustrating additional structure for an alternative embodiment of the containment operation of the invention.
Figure 10:
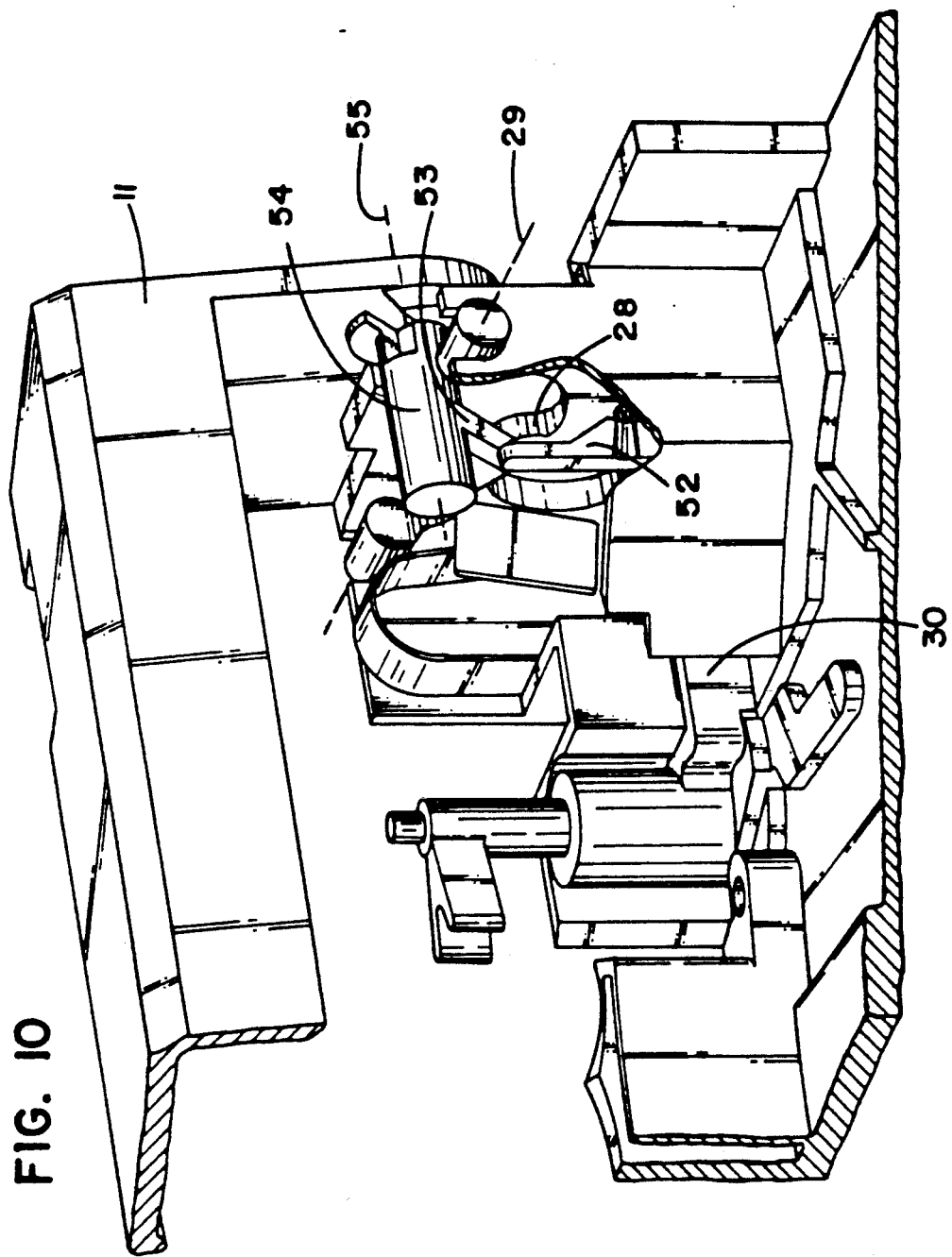
FIG. 10 is an isometric view of the door lock structure, illustrating the tape access door in the open position.

Although most VCR tape transports continually depress the door release pin 32 while the door is open, a small number of tape transports do not operate in this fashion. If the VCR tape transport does not continually depress the door release pin 32, then the release arm 30 is not immobilized when the door is open. Consequently, the arm is free to toggle, which is undesirable. FIG. 9 and FIG. 10 depict additional structures which cooperate to retain the lock plate in the actuated position. In FIG. 9, the door 11 is closed and the lock plate is in the normal position with the lock pin inserted into the door 11. Thus, the configuration of FIG. 9 corresponds to the component positioning associated with an empty adapter outside of the VCR machine. In FIG. 10, the interlock arm 30 has been rotated into the "door normal" position. The lock plate 28 has been depressed by the VCR transport and the tape access door has been rotated into the open position.

As shown in FIG. 10, the lock plate 28 carries a lock plate finger 52 which abuts a post 53, carried on the door pivot 54. Thus, in operation, rotation about the door pivot access 55 is prevented by the interference between the post 53 and the finger 52. In this condition, the lock plate 28 is immobilized and prevented from rotating about axis 29, thus ensuring engagement of the abutment surfaces associated with the interlock arm 30 and the lock plate shown by reference numeral 46 in FIG. 5.

Any attempt to extract the interconnection from the take-up side of the adapter results in a collision between the actuator portion of the interconnection and the and the forked member 26. It is preferred to have the tape and the connection between the tape interconnector fail prior to any other interconnection failure to ensure that potential damage to the VCR is minimized.

Therefore, in operation, any failure mode which would attempt to withdraw the interconnector from the take-up side of the adapter, while the tape access door is open, would preferably result in the failure of the tape-to-inter-connector junction which would be contained within the housing and thus protect the video tape heads.

ANTI INSERTION FUNCTION

The anti-insertion prevents the user from inserting the adapter into the videotape machine until the tape/tether interconnection is transported into the take-up reel side of the adapter.

In the embodiment shown, a small anti-insertion interlock tab 42 is adapted for rotation so that it may extend out of the housing of the adapter 10 to spoil the form factor of the adapter, and thus prevent the user from inserting the adapter into the videotape machine until the interconnection 24 is safely within the take up reel side of the adapter.

The schematic mechanical diagram of FIG. 2 depicts anti-insertion interlock elements in plan view. In this figure, the anti-insertion tab 42 is shown extending from the adapter base 38 in the "out" position. When the interconnection transferred into the take-up side of the adapter, the tab 42 withdrawn into the adapter.

In operation, the tab 42 is slaved to the operation of the forked actuator 26. That is, the tab 42 is driven to the "out" position when the interconnection 24 is on the supply side 13 of the adapter, and is driven to the "in" position when the interconnection is located on the take-up side 15 of the adapter.

As shown in FIG. 2, motion is transferred from the ring driver arm 45 to a transfer arm 49 which is attached to the ring 44 an which causes the ring 44 to rotate. A ring lever 48 is located on the ring, and this element is joined to the tab 42 through a socket joint 50 formed in the tab 42. It is important to note that the connection between the ring driver arm and the transfer arm 49 are not socketed. Consequently, the tab cannot affect the position of the interlock arm 30. For example, manually forcing the tab into the adapter against the restoring force of the leaf spring 51, does not affect the position of the interlock arm.

In summary, the user loads the cartridge into the adapter door and closes it. The closure makes the interconnection between the supply and take-up assemblies. The user then manually transfers the interconnection into the take-up side of the adapter which retracts the anti-insertion tab 42 and releases the lock plate 28, thus releasing the "door interlock" and disabling the "anti-insertion" structures. With the adapter so configured, the user may insert it into the VHS machine. An appropriately configured adapter will have the tape access door cammed open which will then invoke the "containment" structures.

What is claimed is:

1. An adapter for adapting a cartridge to a cassette format comprising:
   a housing, having a laterally disposed take-up side and having a laterally disposed supply side;
   a take-up reel located within said housing in said take-up side;
   cartridge acceptance means, located laterally within said housing in said supply side, for receiving and retaining a single supply reel cartridge;
   tether means connected to said take-up reel and threaded across said housing, from said take-up side to said supply side, for defining a tape path;
   a tape access door connected to said housing for covering said tape path when said door is in a first closed position, and for permitting access to said tape path when said door is in a second open position;
   actuator means coupled to said tether means, and adapted for movement along said tape path for operating interlock means;
   said interlock means, proximate said tape path, adapted for operation by said actuator means, for preventing opening of said tape access door while said actuator means in on said supply side of said housing and for permitting opening of said door while said actuator means is on said take-up side of said housing.

2. The apparatus of claim 1 wherein said interlock means, comprises:
   lock plate means, mounted in said housing, proximate said door, moveable from a first locked position to a second unlocked position, for locking said door in a closed position when said lock plate means is in said first locked position, and for releasing said door so that it may be opened, when said lock plate means is in second unlocked position; and
   interlock arm means, mounted in said housing, proximate said lock plate means, adapted for operation by said actuator means, from a first normal position when said actuator means in on said supply side of said housing, to a second interlock position when said actuator means in on said take-up side of said housing, for preventing movement of said lock plate means from said first to said second position, when said actuator means in on said supply side of said housing, and for permitting movement of said lock plate means from said first position to said second position when said actuator means is on said take-up side of said housing.

3. The apparatus of claim 1 wherein said interlock means, comprises:
   lock plate means, mounted for partial rotation in said housing, proximate said door, rotatable from a first locked position to a second unlocked position, for locking said door in a closed position when said lock plate means is in said first locked position, and for releasing said door so that it may be opened when said lock plate means is in said unlocked position,
   said lock plate means having a lock plate abutment surface;

interlock arm means, mounted for partial rotation in said housing, proximate said lock plate means, adapted for rotation by said actuator means, from a first normal position when said actuator means is on said supply side of said housing and to a second interlock position when said actuator means is on said take-up side of said housing, said interlock arm means having an interlock arm abutment surface for engaging said lock plate abutment surface when said arm means rotates from said first position to said second position.

4. An adapter for adapting a cartridge to a cassette format comprising:

a housing, having a laterally disposed take-up side and having a laterally disposed supply side;

a take-up reel located within said housing in said take-up side;

cartridge acceptance means, located laterally within said housing in said supply side, for receiving and retaining a single supply reel cartridge;

a tether connected to said take-up reel and threaded across said housing, from said take-up side to said supply side, to define a tape path;

actuator means, coupled to said tether, and adapted for movement along said tape path for operating anti-insertion means;

said anti-insertion means, adapted for actuation by said actuator means, for altering the shape of said housing while said actuator means is on said supply side of said housing and for restoring the shape of said housing while said actuator means is on said take-up side of said housing.

5. The apparatus of claim 4 wherein said anti-insertion means comprises:

tab means, located in said housing, mounted for rotation from a first in position where said tab is substantially entirely contained within said housing, to a second out position where said tab means extends outside of the periphery of said housing, in response to the position of said actuator means such that said out position corresponds to said actuator means being located in said supply side of said housing and such that said in position of said tab means corresponds to said actuator means being located in said take-up side of said housing.

6. An adapter for adapting a cartridge to a cassette format comprising:

a housing, having a laterally disposed take-up side and having a laterally disposed supply side;

a take-up reel located within said housing in said take-up side;

cartridge acceptance means, located laterally within said housing in said supply side, for receiving and retaining a single supply reel cartridge;

a tether connected to said take-up reel and threaded across said housing, from said take-up side to said supply side, to define a tape path;

a tape access door connected to said housing for covering said tape path when said door is in a first closed position, and for permitting access to said tape path when said door is in a second open position;

actuator means coupled to said tether, and adapted for movement along said tape path for operating containment means;

said containment means, proximate said tape path, adapted for actuation by said actuator means, for preventing said tether from moving to said supply side of said housing while said door is in said open position and while said actuator means is on said take-up side of said housing.

* * * * *

UNITED STATES PATENT AND TRADEMARK OFFICE
CERTIFICATE OF CORRECTION

PATENT NO. : 5,082,196

DATED : January 21, 1992

INVENTOR(S) : Thomas A. Turgeon

It is certified that error appears in the above-identified patent and that said Letters Patent is hereby corrected as shown below: On the title page:

After "Assignee:", delete the word "Minneapolis" and substitute therefore--Minnesota--

In Col. 1, line 57, delete the word "dependant" and substitute therefore--dependent--

In Col. 2, line 10, delete the word " DRAWING" and substitute therefore--DRAWINGS--

In Col. 2, line 11, delete the word "drawing" and substitute therefore--DRAWINGS--

In Col. 2, lines 30 and 33, the word anti-insertion should be in quotes--"anti-insertion"--

In Col. 2, lines 35 and 39, the words door lock should be in quotes--"door lock"--

In Col. 2, line 55, delete the word "videotape" and substitute therefore--video tape--

In Col. 3, line 4, delete the word "drawing" and substitute therefore--drawings--

In Col. 3, line 11, delete the words "in to" and substitute therefore--into--

UNITED STATES PATENT AND TRADEMARK OFFICE
CERTIFICATE OF CORRECTION

PATENT NO. : 5,082,196

DATED : January 21, 1992

INVENTOR(S) : Thomas A. Turgeon

It is certified that error appears in the above-identified patent and that said Letters Patent is hereby corrected as shown below:

In Col. 3, line 24, after the word "This", delete the word--is--

In Col. 3, line 42, after the word "application", delete the words--Ser. No.--

In Col. 3, lines 41, 42 and 43, "Patent application" should read --Patent Application--

In Col. 3, line 64, delete the word "videocartridge" and insert therefore--video cartridge--

In Col 4, line 13, delete the word "videotape" and insert therefore--video tape--

In Col 4, line 23, delete the words "U.S. patent application" and insert therefore--U.S. Patent Application--

In Col. 4, line 24, after the word "application, delete the words--Ser. No.--

In Col. 4, line 26, delete the word "application" and insert therefore--Application--

UNITED STATES PATENT AND TRADEMARK OFFICE
CERTIFICATE OF CORRECTION

PATENT NO. : 5,082,196

DATED : January 21, 1992

INVENTOR(S) : Thomas A. Turgeon

It is certified that error appears in the above-identified patent and that said Letters Patent is hereby corrected as shown below:

In Col. 4, line 29, after the numberal "2", delete--.--

In Col. 4, line 34, delete the words "patent application" and insert therefore--Patent Application--

In C0l. 4, lines 34 and 35, after the word "application", delete the words--Ser. No.--

In Col. 4, line 39, delete the word "videotape" and insert therefore--video tape--

In Col. 4, lines 40 and 42, please delete the word "videocassette" and insert therefore--video cassette--

In Col. 4, lines 64 and 65, please delete the word "Fig." and insert therefore--Figs.--

In Col 5, line 32, please insert quotation marks around the words--"camming action"--

In Col. 5, line 35, please delete the word "Fig." and insert therefore--Figs.--

In Col. 5, line 38, please insert quotation marks around the word--"jammed"--

UNITED STATES PATENT AND TRADEMARK OFFICE
CERTIFICATE OF CORRECTION

PATENT NO. : 5,082,196

DATED : January 21, 1992

INVENTOR(S) : Thomas A. Turgeon

It is certified that error appears in the above-identified patent and that said Letters Patent is hereby corrected as shown below:

In Col. 5, line 40, please delete the word "Fig." and insert therefore--Figs.--

In Col. 5, line 46, please delete the word "videotape" and insert therefore--video tape--

In Col. 5, lines 56, 57, 59 and 61, please delete the word "Fig." and insert therefore--Figs.--

In Col. 6, line 12, after the word "interconnector", please delete number "22" and insert therefore--18--

In Col. 6, line 31, after the word "However" please insert--,--

In Col. 6, line 49, please insert quotes around the word--"camming"--

In Col. 7, line 15, after the word "interconnection", please delete the words--and the--

In Col. 7, line 28, please insert quotes around the word--"anti-insertion"--

In Col. 7, lines 29 and 36, please delete the word "videotape" and insert therefore--video tape--

UNITED STATES PATENT AND TRADEMARK OFFICE
CERTIFICATE OF CORRECTION

PATENT NO. :   5,082,196

DATED      :   January 21, 1992

INVENTOR(S) :  Thomas A. Turgeon

It is certified that error appears in the above-identified patent and that said Letters Patent is hereby corrected as shown below:

In Col. 7, line 40, please insert quotation marks around the word--"anti-insertion"--

In Col. 7, line 44, after the number "42", please insert the word--is--

In Col. 7, line 53, please delete the word "an" and insert therefore--and--

In Col.8, line 5, please insert quotation marks around the word--cammed--

In Col. 8, in claim 2, lines 47, 49 and 52, please delete the word "in" and substitute therefore--is--

Signed and Sealed this

Tenth Day of August, 1993

Attest:

MICHAEL K. KIRK

*Attesting Officer*   Acting Commissioner of Patents and Trademarks